United States Patent [19]
Milde, Jr.

[11] Patent Number: 4,807,101
[45] Date of Patent: Feb. 21, 1989

[54] AUTOMATIC HAZARD LIGHT FOR A MOTOR VEHICLE

[75] Inventor: Karl F. Milde, Jr., Mahopac, N.Y.

[73] Assignee: V-Tronics Corp., Mahopac, N.Y.

[21] Appl. No.: 83,042

[22] Filed: Aug. 10, 1987

Related U.S. Application Data

[63] Continuation-in-part of Ser. No. 832,437, Feb. 24, 1986, abandoned, which is a continuation-in-part of Ser. No. 670,901, Nov. 13, 1984, abandoned.

[51] Int. Cl.[4] .......................... F21V 23/00; B60Q 1/00
[52] U.S. Cl. .................................. 362/276; 340/52 R; 340/72
[58] Field of Search ........................ 362/276, 802, 61; 340/52 R, 52 B, 72; 180/197

[56] References Cited

U.S. PATENT DOCUMENTS

| | | | |
|---|---|---|---|
| 3,157,854 | 11/1964 | Riley . | |
| 3,528,056 | 9/1970 | Voevodsky | 340/72 |
| 3,631,390 | 12/1971 | Murphy | 340/72 |
| 3,665,391 | 5/1972 | Bumpous | 340/72 |
| 3,771,122 | 11/1973 | Sattler | 340/62 |
| 3,790,932 | 2/1974 | Ridpath | 340/62 |
| 3,846,749 | 11/1974 | Curry . | |
| 3,911,392 | 10/1975 | Fleagle | 340/52 B |
| 3,921,127 | 11/1975 | Narbaits-Jaureguy et al. | 340/62 |
| 3,952,284 | 4/1976 | Martin . | |
| 4,107,647 | 8/1978 | Yoshino . | |
| 4,124,840 | 11/1978 | Kobayashi | 340/62 |
| 4,258,353 | 3/1981 | Carlsen . | |
| 4,346,365 | 8/1982 | Ingram | 340/72 |
| 4,357,594 | 11/1982 | Ehrlich et al. . | |
| 4,583,173 | 4/1986 | Odlen et al. | 340/52 R |
| 4,633,215 | 12/1986 | Anders et al. | 340/84 |

FOREIGN PATENT DOCUMENTS

| | | |
|---|---|---|
| 1944916 | 4/1971 | Fed. Rep. of Germany . |
| 2114732 | 9/1972 | Fed. Rep. of Germany . |
| 2219175 | 10/1973 | Fed. Rep. of Germany . |
| 2806801 | 8/1979 | Fed. Rep. of Germany . |
| 3516118 | 11/1986 | Fed. Rep. of Germany . |
| 55-76717 | 6/1980 | Japan . |

*Primary Examiner*—David A. Okonsky

[57] ABSTRACT

Electric circuit apparatus is disclosed for automatically controlling the tail light of a motor vehicle so as to assist in preventing accidents. An electronic control circuit operates an electrical power switch connected between the tail light and a source of voltage in such a way that the tail light is automatically turned on when the speed of the vehicle falls below a prescribed threshold, such as 15 mph, for a prescribed period of time, such as 10 seconds, and/or a number of other stated conditions occur.

22 Claims, 6 Drawing Sheets

AUTOMATIC HAZARD LIGHT FOR A MOTOR VEHICLE

CROSS-REFERENCE TO RELATED APPLICATIONS

This application is a continuation-in-part of my U.S. patent application Ser. No. 832,437, filed Feb. 24, 1986, now abandoned, which is a continuation-in-part of my U.S. patent application Ser. No. 670,901, filed Nov. 13, 1984, now abandoned.

BACKGROUND OF THE INVENTION

The present invention relates to the field of motor vehicles and, more particularly, to a device for automatically controlling a tail light on a motor vehicle so as to avoid motor vehicle accidents.

Frequently, a motorist experiences a traffic situation of the following nature: The vehicle which the motorist is driving —call it "Vehicle 2"—is proceeding down a highway at a normal highway speed—say, 30-65 mph—while the vehicle of another motorist—call it "Vehicle 1"—is stopped or proceeding considerably slower on the same highway ahead of Vehicle 2. There may be any number of reasons why Vehicle 1 has stopped or proceeds slowly: The operator of Vehicle 1 may intend to turn left after oncoming cars have passed; there may be traffic congestion ahead of Vehicle 1; Vehicle 1 may be proceeding slowly because the road is upwardly inclined; Vehicle 1 may have stopped or may be proceeding slowly because the operator of Vehicle 1 is looking at something along the road; or Vehicle 1 may be disabled with an overheated engine, flat tire or the like. Sometimes the operator of Vehicle 1 will have applied the brakes, so that the brake lights of Vehicle 1 are illuminated, alerting the operator in Vehicle 2. Quite often, however, the operator of Vehicle 1 does not have a need to apply the brakes because Vehicle 1 has already stopped, is proceeding slowly at a steady speed, or is even accelerating. The operator of Vehicle 1 can switch on flashing "hazard" lights, but this requires positive action on the operator's part which is frequently forgotten. In the absence of any warning lights (brake lights or hazard lights) on Vehicle 1, the operator of Vehicle 2 may not notice that Vehicle 1 has stopped or is proceeding slowly until it is too late to prevent Vehicle 2 from colliding with the rear of Vehicle 1.

There are numerous other situations in which it would be desirable and helpful to turn on the tail of a first vehicle (Vehicle 1) to warn the operator - driver of a second vehicle (Vehicle 2), which is behind the first vehicle and proceeding in substantially the same direction, of an increased danger of a collision.

SUMMARY OF THE INVENTION

It is an object of the present invention to provide means for automatically controlling a tail light of a motor vehicle in such a way as to alert drivers behind this vehicle that this vehicle has either stopped or is proceeding very slowly on a highway.

It is a further object of the present invention to provide means for automatically controlling a tail light of a motor vehicle in such a way as to alert drivers behind this vehicle that there is an increased danger of collision with this vehicle.

These objects, as well as other objects which will become apparent from the discussion that follows, are achieved, according to the present invention, by providing a system that automatically switches on a warning tail light of a motor vehicle (such as the hazard lights) when the motor vehicle operator fails to do so and for substantially the same reasons that would lead a vehicle operator to manually switch on the hazard lights; in particular:

(1) when the motor vehicle speed (instantaneous or average speed) falls below a prescribed threshold speed for a prescribed period of time;

(2) when the instantaneous motor vehicle speed falls below the time average vehicle speed by a prescribed amount for a prescribed period of time;

(3) when the closure speed between the motor vehicle and another motor vehicle, either in front or in the rear, exceeds a prescribed value;

(4) when the distance between the motor vehicle and another motor vehicle, either in front or in the rear, falls below a prescribed value;

(5) when one road wheel of the motor vehicle does not rotate at substantially the same speed as another road wheel or the other road wheels of the vehicle (thus indicating wheel spinning, skidding or brake lock); and/or (6) when the motor vehicle is mechanically disabled for any reason.

Such a system can be easily and inexpensively realized by providing (a) a switch between a source of voltage and a tail light, and (b) a switch control circuit, coupled to this switch, for closing the switch, thereby automatically connecting the tail light with the voltage source, after (either immediately after or some prescribed delay time after) some other event occurs, indicating the necessity or desirability of switching on a hazard light.

It is contemplated that the switch will turn on the conventional flashing hazard lights of a motor vehicle. In the alternative, the switch can operate a special warning light visible from the rear, such as a rotating beacon, or even the conventional tail lights of a motor vehicle in any other manner so as to warn all vehicles approaching from the rear.

As used herein, the term "prescribed", as in "prescribed threshold speed" and "prescribed period of time", merely means "particular", "distinct", or "given". It is not intended that this term be limiting in any way and, specifically, it is *not* used in the sense of "fixed" or "preset". All "prescribed" parameters which are used in the system according to the invention to trigger the switch that turns on a tail (hazard) light of a motor vehicle may have any value, from zero to any desired number, and may be:

(1) preset at the factory when the system is manufactured;

(2) adjustable by the operator of the motor vehicle (e.g. by a knob or the like on the dashboard or steering column); and/or (3) automatically adjustable in response to other parameters.

The prescribed speed threshold, below which the tail light of the motor vehicle is automatically switched on in one embodiment of the invention, is preferably in the range of 0-30 mph. For example, the prescribed speed may be approximately 15 mph, a relatively slow speed compared to normal highway speeds of 30-65 mph. Alternatively or additionally, the prescribed speed threshold may be much slower; for example, in the range of 0-5 mph. This will ensure that the tail light is switched on only when the vehicle is stopped, stalled or disabled.

Similarly, the "prescribed period of time" may be anywhere in the range of 0 to 60 seconds. A ten second period would appear appropriate and convenient for most applications.

it will be understood that each condition described above—for example, after the absolute or average speed of the vehicle falls below a prescribed speed for a prescribed period of time—may be only one of a number of conditions, all of which *must* be (AND function), or any of which *may* be (OR function), present to cause a tail light to be automatically switched on. Thus, according to a preferred embodiment of the present invention, a number of conditions are combined, as follows:

(1) In order to avoid the illumination of the tail light at all times when the vehicle is parked, it is preferable that the tail light be automatically switched on only if the ignition switch of the vehicle is also switched on. This may be accomplished by connecting the tail light switch, provided according to the present invention, in series with the ignition switch. As used herein, the term "ignition switch" is intended to refer to the switch that controls the power to the engine ignition system, to the switch that is activated by the presence of the ignition key in the key slot, and/or to any other switch which indicates the presence of the motor vehicle operator in the vehicle and/or his intention to operate the vehicle.

(2) In order to avoid the illumination of the tail light when the vehicle is briefly brought to a halt at a traffic light, stop sign, toll booth or other normal traffic interruption, it is preferable that the tail light be switched on only after a period of time has elapsed since the speed of the vehicle falls below, and remains below, the aforementioned prescribed speed. This time period, which may be in the range of 30 seconds to two minutes, for example, may be adjusted by the operator or automatically adjusted in accordance with driving conditions. For example, if the vehicle has been driving in stop and go city traffic, the adjustment may be different than if it has been driving for lengthy periods at high speed along major thoroughfares or superhighways. A suitable microprocessor program can easily keep track of the recent driving "history" of the vehicle and make suitable adjustments automatically.

(3) In order to avoid the illumination of the tail light whenever the ignition switch is turned on to start the vehicle engine, it is preferable that the tail light be switched on only if the vehicle engine temperature— e.g., the engine coolant temperature—exceeds a prescribed threshold, for example 150 degrees F. Substantially the same effect can be accomplished by connecting a timer to the ignition switch and permitting the tail light to be switched on only when a prescribed length of time has elapsed after the ignition switch is turned on. This time may be in the range of 1-2 minutes, for example.

(4) At the expense of some additional hardware such as a police or Rashid VRSS radar system which detects the closing speed and distance of approaching vehicles, it is advantageous if the tail light be switched on if a second motor vehicle approaches the first vehicle from behind, or the first vehicle approaches the rear of the second vehicle, with a closing speed—i.e., with a difference in speeds between the two vehicles—which exceeds a prescribed value, and/or with a distance between the two vehicles that falls below a prescribed value. The requirement that a plurality of such conditions exist before automatically switching on a tail light reduces the possibility that the tail light will be switched on at unnecessary and inappropriate times.

When a motor vehicle provided with a warning system according to the present invention is involved in a traffic situation of the type described above in the "Background of the Invention" section, it will indicate to motorists behind it that it is either proceeding very slowly down the highway or has stopped completely, whether or not the operator of this vehicle has applied the brakes or has manually turned on the hazard lights.

If the system according to the present invention should automatically switch on the tail light of a vehicle, thus indicating a hazard, when in fact there is no hazard, the operator of the motor vehicle may switch this tail light off by operation of an override switch. Such switching *off* of an automatically switched on tail light, requiring positive action on the part of the motor vehicle operator, is preferable to systems, presently known in the art, which require the vehicle operator to take positive action to switch the hazard lights *on*.

In a particular, advantageous embodiment of the present invention, the device for controlling the tail light switch operates to turn the switch on and off at a rate which is dependent upon the speed of the vehicle. In this way, motorists behind the vehicle may observe at a glance the speed with which this vehicle is traveling.

It will be understood that the "tail light" of a motor vehicle, as this term is used herein, may be any one of the lights arranged at the rear of the vehicle for signaling motorists behind it. For example, the tail light may be the red brake lights of the motor vehicle; it may be the amber turn signal lights; it may be the white back-up lights or it may even be an additional light of the same or another color which is mounted on the top or rear of the motor vehicle. An example of the latter type of "tail light" would be a rotating beacon arranged in the rear window of a motor vehicle.

For a full understanding of the present invention, reference should now be made to the following detailed description of the preferred embodiments of the invention and to the accompanying drawings.

DESCRIPTION OF THE PREFERRED EMBODIMENTS

The preferred embodiments of the present invention will now be described with reference to FIGS. 1–11 of the drawings.

Figure 1:
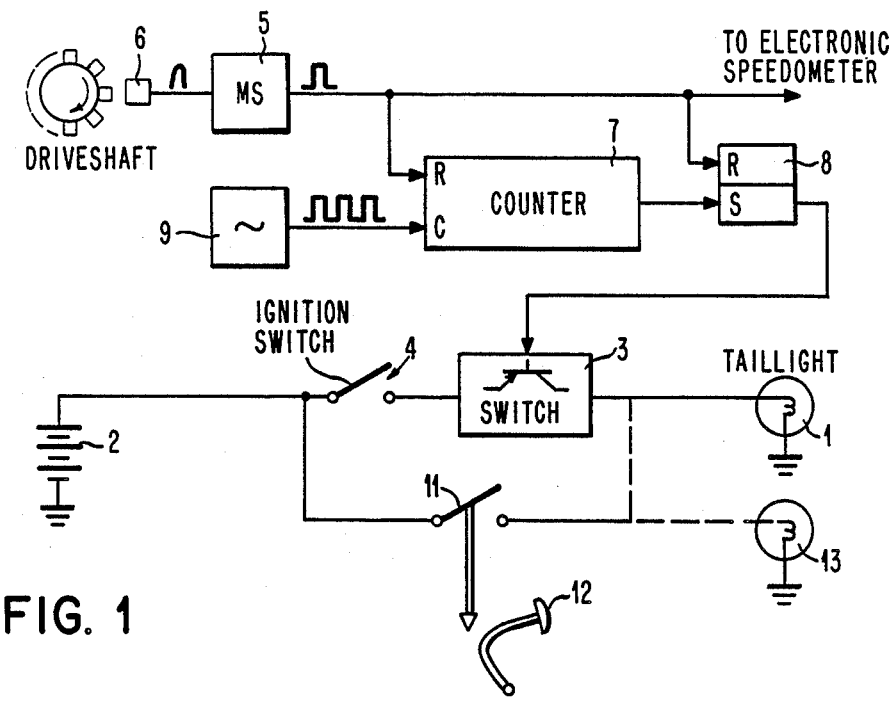
FIG. 1 shows an electrical circuit according to one preferred embodiment of the present invention for controlling the tail light of a motor vehicle.

FIG. 1 illustrates a motor vehicle tail light 1 which is connected to a source of voltage 2—i.e., the motor vehicle battery—via an electronic power switch 3 and an ignition switch 4.

The electronic switch is turned on (i.e., "closed") by means of an electronic control circuit when the speed of the motor vehicle falls below a prescribed threshold, such as 15 mph. The tail light remains off when the vehicle is stopped and the ignition switch is turned off.

The control circuit comprises a monostable multivibrator 5 which receives electrical pulses from a drive shaft rotation sensor 6. Pulses produced by the monostable MV 5 are supplied to the electronic speedometer and odometer of the motor vehicle. These pulses are also applied, as reset pulses, to a counter 7 and a flip-flop 8. Clock pulses are supplied to the counter by an oscillator 9.

The counter 7 produces a carry pulse on its output carry line 10 whenever the counter has reached its maximum count. This situation will occur unless the counter is reset before reaching its maximum count by a pulse from the monostable MV 5. The carry pulse produced by the counter 7 sets the flip-flop 8 which, in turn, supplies a control signal that turns on the switch 3.

The flip-flop 8 is reset each time a pulse is received from the monostable MV 5. If the vehicle is proceeding slowly, this flip-flip 8 will be set again shortly thereafter by the carry pulse from the counter 7. It will be understood that the rate at which the flip-flop 8 is reset is directly dependent upon the speed of the motor vehicle. This causes the switch 3 and, thus, the tail light 1 to be turned on and off at a rate which is dependent upon the speed of the vehicle. If the vehicle speed exceeds the prescribed threshold, the counter will be unable to produce a carry pulse and the switch 3 and tail light 1 will remain off.

Also shown in the figure is a mechanical switch 11 that is operated by the vehicle brake pedal 12. This switch 11 is normally incorporated into the hydraulic brake cylinder of the motor vehicle. The brake switch 11 can be connected in parallel with the electronic switch 3 to operate the tail light 1, or it may be connected to a separate tail light 13 in the manner shown in dashed lines.

Figure 2:
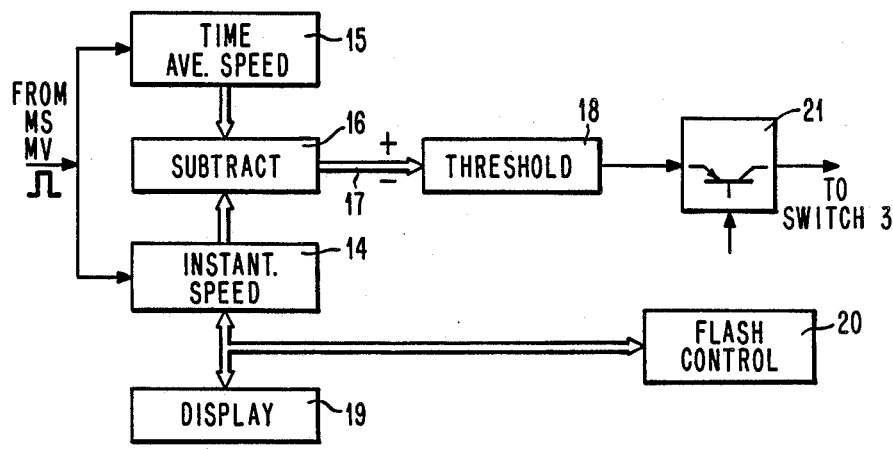
FIG. 2 is a block diagram of a second preferred embodiment of the present invention.

FIG. 2 illustrates a modification of the circuit of FIG. 1 wherein the switch 3 is turned on, thus illuminating the tail light 1, whenever the instantaneous speed of the vehicle drops abruptly. This arrangement would cause the tail light to be illuminated, for example, when the vehicle is brought to a standstill on a highway. The tail light 1 would not be illuminated when the vehicle is initially started in a parking lot or a garage.

Pulses from the monostable MV 5 are applied to two digital circuits: a first circuit 14 which integrates these pulses once to determine the instantaneous speed, and a second circuit 15 which integrates these pulses twice to determine the time average speed of the vehicle. Digital signals representing the instantaneous speed and time average speed, respectively, are applied to a subtractor 16 which produces an output on parallel lines 17 representative of the difference between the time average speed and instantaneous speed. If this difference is negative—that is, if the instantaneous speed is less than the time average speed—with an absolute value in excess of a prescribed threshold, a threshold circuit device 18 produces an output signal which turns on the switch 3.

The instantaneous speed, determined by the circuit 14 may be displayed by a speedometer/display device 19. This speed may also be applied to a flash control circuit 20 which operates an electronic switch 21 in the circuit between the threshold device 18 and the switch 3. The flash control device 20 functions to turn the switch 3 on and off at a rate which is dependent upon the speed of the vehicle.

Figure 3:
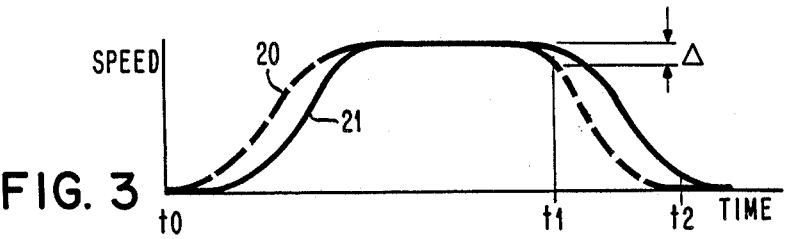
FIG. 3 is a graph of time versus speed, illustrating the operation of the embodiment of FIG. 2.

FIG. 3 illustrates the operation of the circuit of FIG. 2. In FIG. 3, the curve 20 represents the instantaneous speed S of vehicle whereas the darker curve 21 represents the time average speed $S_{ave}$; namely, the instantaneous speed S integrated over a period of time, such as the previous minute. The integral may be divided by this period of time, or by some other constant K, to give the average.

$$S_{ave} = \frac{\int_{60 \text{ sec.}} S\, dt}{K}$$

As is shown, the vehicle speed starts at zero at time $t_0$, increases to a plateau (the normal driving speed) and then falls off to zero again. The average speed follows the instantaneous speed with some delay. At time $t_1$, the difference between the instantaneous speed and the average speed is a negative value which exceeds a prescribed threshold. At this time the tail light 1 is caused to turn on. Sometime later, at time $t_2$, the average speed "catches up" with the instantaneous speed so that the difference between these two values falls below the prescribed threshold and the tail light 1 is turned off.

Figure 4:
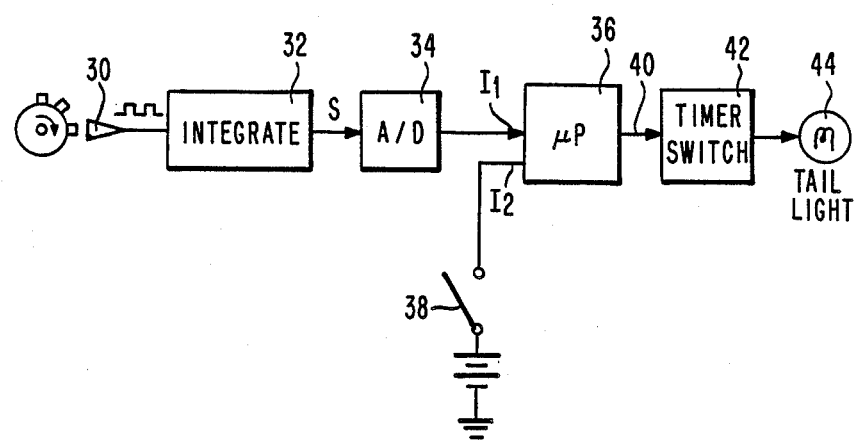
FIG. 4 is a block diagram of a third preferred embodiment of the present invention which includes a microprocessor.

FIG. 4 shows still another embodiment of the circuit according to the invention for automatically controlling a tail light of a motor vehicle. A drive shaft rotation sensor 30 produces pulses which are integrated by a circuit 32 to provide an analog speed signal S. An A/D converter 34 supplies this signal S, in digital form, to a first input $I_1$ of a microprocessor 36. The microprocessor receives at a second input $I_2$ a "1" or "0" signal in dependence upon the position of the vehicle "ignition switch" 38. As indicated above, this switch may be the switch that controls the power to the vehicle ignition system, the switch indicating the presence or absence of the ignition key in its slot, or some other relevant switch that indicates that the associated motor vehicle is being operated.

The microprocessor 36 operates on the signals presented at the inputs $I_1$ and $I_2$ and produces a signal on its output line 40 which resets a timer switch 42 to its initial state. When the timer 42 receives such a reset pulse, it switches on the power to the motor vehicle tail light 44. Preferably, the tail light is provided with a flasher, so that it will blink in the manner of conventional motor vehicle "hazard lights". The timer 42 remains switched on until it times out, for example after 10 seconds.

Figure 5:
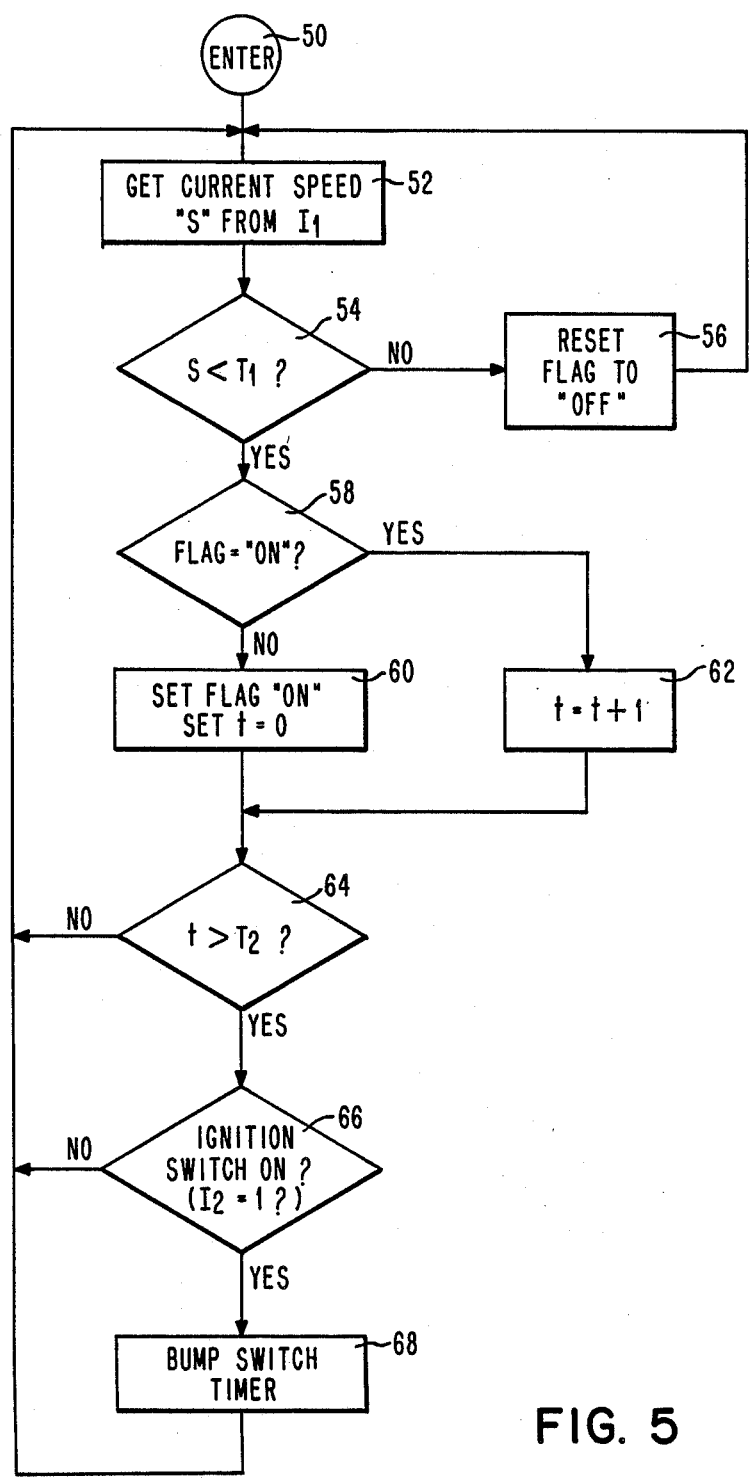
FIG. 5 is a flow chart of a program which may be used with the microprocessor in the embodiment of FIG. 4.

The microprocessor 36 is programmed in accordance with the algorithm or routine shown in FIG. 5. After the routine is entered at 50 it immediately obtains the current speed S from the input $I_1$ (block 52). If this speed is equal to or greater than the prescribed threshold speed $T_1$ (e.g., 15 mph) at block 54 then a flag is reset to "off" at block 56 (if it is not already off) and the routine returns to the beginning. If the speed S is less than the threshold speed $T_1$, then the program determines whether or not the flag is on (block 58). If the flag was off, then the flag is set to "on" and a parameter t is set equal to zero (block 60). If the flag was "on" at block 58, then the parameter t is incremented by one (block 62).

The parameter t is then tested at block 64 to determine whether it has exceeded a second threshold $T_2$. The purpose of this test is to take action, to cause the tail light to switch on, only after the speed S has remained below the prescribed threshold $T_1$ for a prescribed length of time. If the parameter t has not yet reached the threshold $T_2$, the routine starts again from the beginning; if it has, then the program tests to determine whether the ignition switch is on (block 66). If it is not, the program returns to the beginning; if it is on, then the microprocessor produces a pulse at its output 40 to reset the timer switch 42 (block 68).

Figure 6:
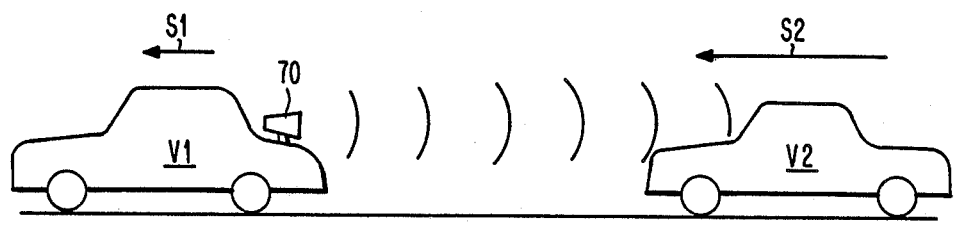
FIG. 6 is a diagram showing a second vehicle V2 traveling behind a first vehicle V1 at a greater speed S2 than the speed of the first vehicle S1.

FIG. 6 illustrates how a first vehicle V1 may determine the closing speed of a second vehicle V2. In this case, the vehicle V1 is provided with a conventional police radar system, having an antenna 70 pointed toward the rear, for measuring the closing speed of an oncoming vehicle V2. If the vehicle V1 were stationary, then the radar would exactly determine the absolute speed $S_2$ of the vehicle V2. If the vehicle V1 is in motion with a speed $S_1$, then the radar determines the difference between the speeds of the vehicles V1 and V2; that is, the difference $S_2-S_1$. According to the invention, this difference $S_2-S_1$ is used as one of the conditions for automatically switching on the tail lights (hazard lights) of the vehicle V1. In particular, if the difference $S_2-S_1$ exceeds a prescribed threshold, then the vehicle V1 is in danger of being struck by the vehicle V2 and the hazard lights of the vehicle V1 are switched on.

Instead of a police radar system, it is, of course, also possible to use a Rashid VRSS collision warning system, or any other system which is capable of determining the presence and/or relative speed of another vehicle from a first vehicle. For example, it is desirable to automatically turn on the tail light of a motor vehicle if another vehicle behind it comes too close. In this case, a proximity warning system may be used to detect the presence and distance of a second vehicle with respect to an own vehicle, provided only that the second vehicle is in the same driving lane as the own vehicle. If the second vehicle comes closer than a prescribed distance—say, the distance equal to the speed of the own vehicle divided by ten and multiplied by the length of a standard motor vehicle—then the system according to the present invention automatically turns on a tail light of the own, first vehicle to prevent "tailgating" by the second vehicle behind it.

Figure 7:
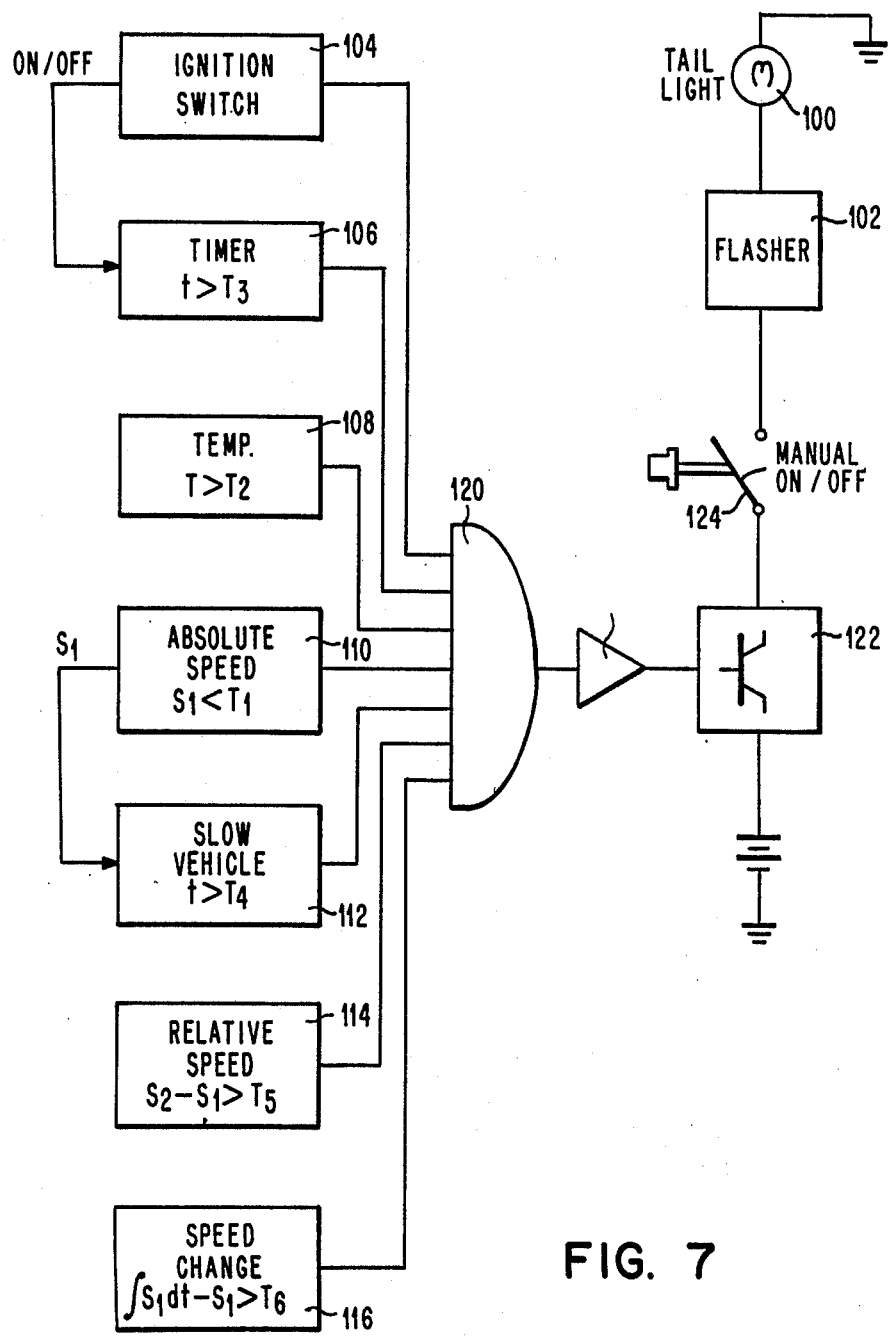
FIG. 7 is a block diagram of a fourth preferred embodiment of the present invention.

FIG. 7 illustrates still another embodiment of the present invention whereby a vehicle tail light 100 and flasher 102 are switched on upon the simultaneous occurrence of a number of conditions represented by the blocks 104-116. The outputs of these blocks are supplied to an AND gate 120 which closes a switch 122 if and only if all of the blocks 104-116 produce an output.

After the switch 122 has been closed, thereby switching on the flashing tail light 100, the circuit may be interrupted by the motor vehicle operator, thereby switching off tail light 100, by means of a manual override switch 124.

The conditions for switching on the tail light, represented by blocks 104-116, are as follows:

(1) In block 110, the absolute speed $S_1$ of the vehicle falls below a prescribed threshold $T_1$.

(2) In block 108, the coolant temperature T of the motor vehicle engine exceeds a prescribed threshold $T_2$.

(3) In block 104, the ignition switch of the motor vehicle is turned on.

(4) In block 106, the ignition switch 104 has been turned on for a prescribed length of time $T_3$.

(5) In block 112, the vehicle speed $S_1$ has fallen below the prescribed threshold $T_1$ for a prescribed length of time $T_4$.

(6) In block 114, the difference in speeds $S_2-S_1$ between vehicles V2 and V1 exceeds a prescribed threshold $T_5$.

(7) In block 116, the difference between the instantaneous speed $S_1$ and the time average speed, $S_1 dt$, exceeds a prescribed value $T_6$.

It will be appreciated that less than all of the above mentioned conditions may be used to close the switch 122 to thereby switch on the tail light 100. It will also be understood that further conditions, in addition to or in place of those described above, may be used to automatically determine when the switch 122 is to be closed.

Figure 8:
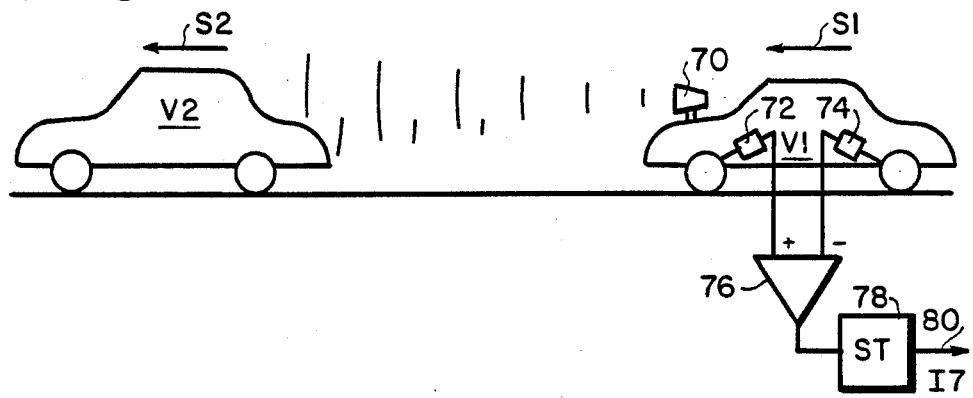
FIG. 8 is a diagram, similar to FIG. 6, showing a second vehicle V2 traveling in front of a first vehicle V1 with a slower speed S2 than the speed of the first vehicle S1.

FIG. 8 illustrates, in a manner similar to FIG. 6, a radar system 70 for detecting the presence, speed and/or closing speed of a second vehicle V2 with respect to an own vehicle V1 behind the second vehicle. In this case, the radar system 70 is mounted on the front of the own vehicle V1 for monitoring possible collisions in the front. The radar system (which may be a police radar, a Rashid VRSS collision warning system or any other similar device) produces a warning signal to alert the driver of the own vehicle of the possibility of a collision. This warning signal is preferably the result of a determination which takes into account *both* the closing speed and distance of any adjacent vehicle either in front of or behind the own vehicle. The closer the distance between the own vehicle and an adjacent vehicle in front or behind, the lower will be the threshold value of closing speed above which a warning signal is produced and an audible and visible alarm is given.

According to the invention, this warning signal is also used to automatically turn on the tail light of the own vehicle to warn the operators of vehicles behind it that the own vehicle may soon slow down or stop abruptly. This "hazard warning" is helpful to prevent "chain reaction" type accidents, where a lead vehicle in a chain collides with a vehicle in front of it, or otherwise stops too abruptly for the vehicle behind, and there is a second collision, and then a third, and so forth.

FIG. 8 further illustrates a tachometer generator 72, 74 or speed measuring device connected to each wheel of the own vehicle V1. The speeds of the front and rear wheels on each side of the vehicle are compared in a comparator 76 and a signal is generated by a threshold circuit (Schmitt trigger) 78 if the difference in speed exceeds a prescribed limit. The output on line 80 generated by the threshold circuit is used to turn on the hazard warning tail lights of the own vehicle V1, as an indication that one or more of the wheels of the vehicle V1 have been "blocked" or locked on braking. There is, of course, an identical circuit for the wheels on the opposite side of the vehicle.

As shown in FIG. 8, the own vehicle V1 is proceeding at a faster speed S1 than is the second vehicle V2, which is traveling at a speed S2, thus creating a possibility of collision.

Figure 9:
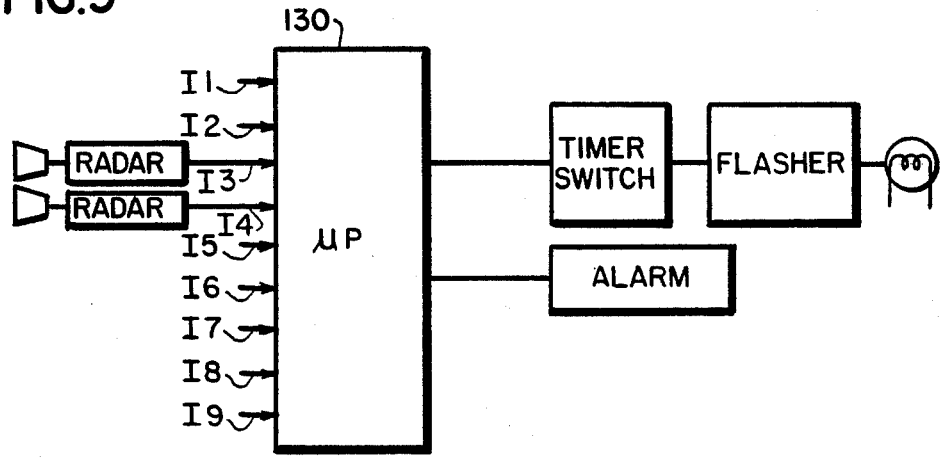
FIG. 9 is a diagram of a dashboard display for a collision avoidance system according to the present invention.

FIG. 9 shows still another embodiment of the present invention wherein a microprocessor 130 monitors a plurality of inputs I1, I2, I3, I4, I5, I6, I7, I8 and I9 and bumps a timer switch, in the manner described above in connection with FIG. 4, when the ignition switch is turned on (a signal is present at input I2), and one or more of the following events occur:

(1) The motor vehicle speed received at input I1 (or the time average of this speed as calculated by the microprocessor) drops below a prescribed threshold speed for a prescribed period of time (as described above in connection with FIG. 5).

(2) The closing speed with respect to a vehicle to the rear (input I3) or a vehicle to the front (input I4) of the own vehicle exceeds a prescribed value (which may be dependent upon the distance to the respective vehicle to the rear or in front).

(3) The distance between the own vehicle and a vehicle to the rear (input I5) or a vehicle to the front (input I6) falls below a prescribed value.

Both the prescribed value of the closing speed (paragraph 2, above) or the distance (paragraph 3, above) may be automatically selected by the microprocessor in accordance with the driving circumstances, or varied manually by the vehicle operator. For example, the prescribed value of distance may be automatically increased with increasing speed of the own vehicle in accordance with the formula:

$$S/10 \text{ times } 12,$$

where S is the vehicle speed (presented at input I1) and I2 is the approximate length (in feet) of a typical vehicle.

The microprocessor may be provided with any number of other inputs I7 which call for switching on the hazard lights when a signal is present. For example, the input I7 may be connected to the output of the AND gate 120 (FIG. 7) or to the threshold gate 78 (FIG. 8), or both.

The microprocessor is provided with two yet additional inputs I8 and I9 which receive digital signals representing manually selected prescribed values. Such prescribed values may be selected by the vehicle operator using a control panel of the type illustrated in FIG. 10.

Figure 10:
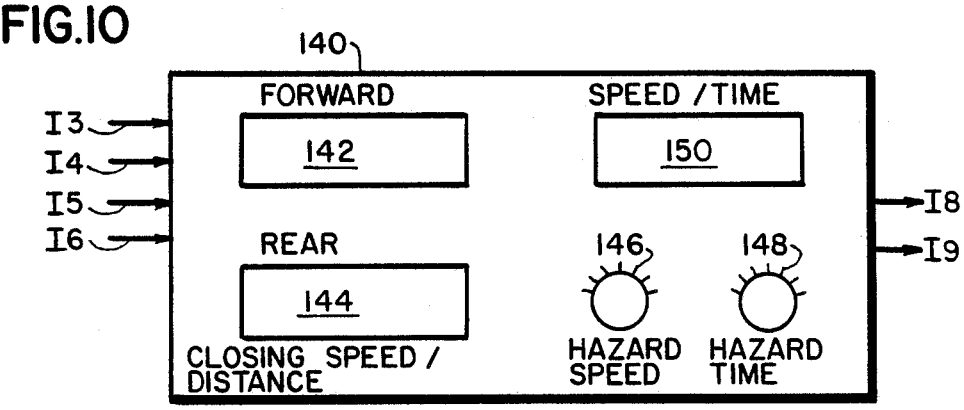
FIG. 10 is a block diagram, similar to that of FIG. 4, showing still another preferred embodiment of the present invention.

FIG. 10 shows a control panel 140 which receives the inputs I3, I4, I5 and I6 from the radar system and produces the microprocessor inputs I8 and I9. The digital signals presented by the inputs I3, I4, I5 and I6 are merely displayed by suitable digital displays 142 and 144. The closing speed and distance of a vehicle to the front and to the rear of the own vehicle may be time-shared on two displays as shown.

Knobs 146 and 148 are provided to permit manual selection of the prescribed speed (T1) and prescribed time (T2) which are used by the microprocessor to determine when to automatically switch on the hazard lights. The settings of these knobs are displayed on a single time-shared digital display 150. The operator of the motor vehicle may thus select the speed and/or time delay at which a tail light (warning or hazard light) is activated.

Figure 11:
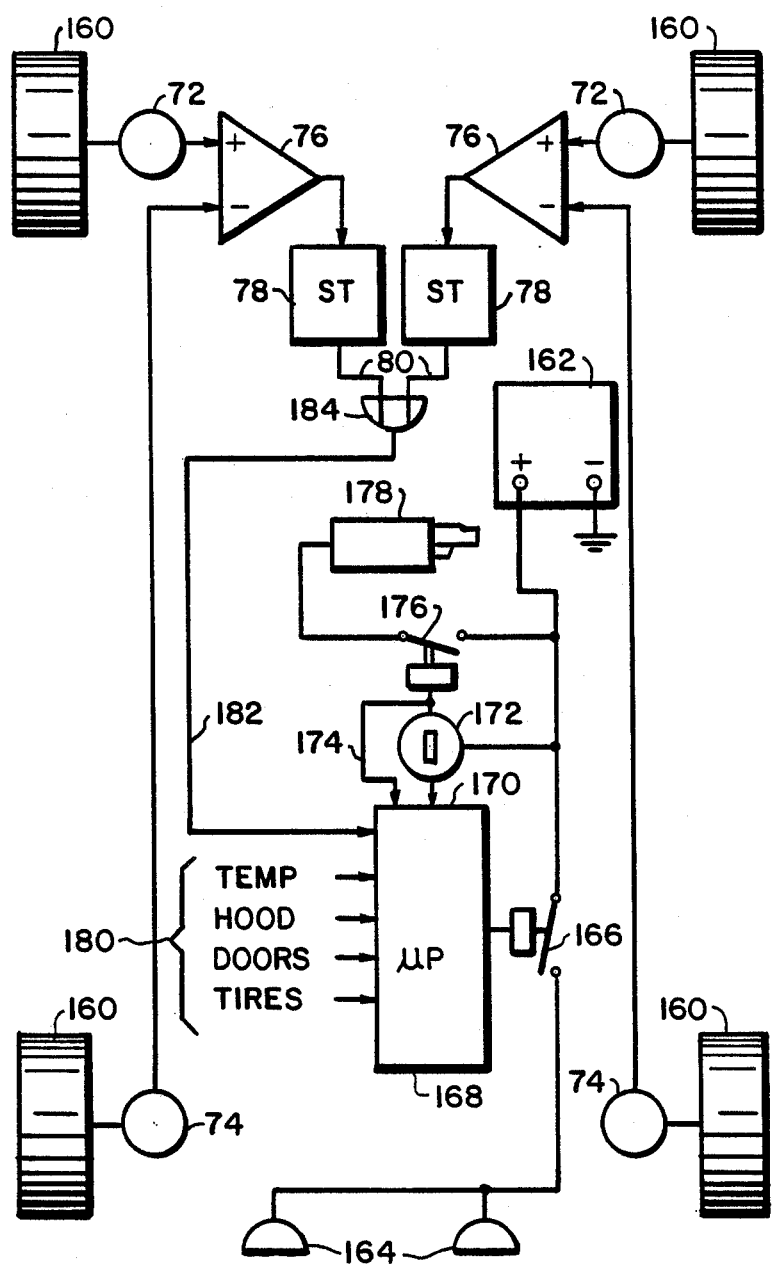
FIG. 11 is a schematic diagram of the wiring of a motor vehicle in accordance with still another preferred embodiment of the present invention.

FIG. 11 shows a portion of a wiring diagram of a motor vehicle comprising four wheels 160, a battery 162 and a pair of tail lights 164 connected to the battery via a relay switch 166. A control device 168 closes the normally open switch 166 when one or more of a number of conditions occur which indicate an increased danger of collision.

The control device receives a signal on line 170 from an ignition switch 172 indicating whether an ignition key has been inserted in the key slot. The control device also receives a signal on line 174 indicating whether the starter relay 176 has been activated (closed) to provide voltage to the engine starter 178. The control device measures the time during which an attempt is made to start the vehicle engine and turns the tail lights 164 on and off in a flashing mode, to provide a hazard warning to others, when the measured time exceeds a time period threshold.

The control device 168 also flashes the tail lights when a number of other conditions occur, indicating that the vehicle is mechanically disabled. As shown by the inputs 180, the control device actuates the switch 166 when the engine temperature exceeds a safe value, when the engine hood is opened, when a vehicle door is opened with the ignition key in the slot, and when a tire is flat or removed from the vehicle. Other common conditions indicating that the vehicle is mechanically disabled will occur to those skilled in the art.

Finally, as described above in connection with FIG. 8, the control device actuates the switch 166 when either front road wheel 160 rotates at a substantially different speed from a corresponding rear road wheel. The respective signal, indicating that a wheel is spinning or is brake locked, is supplied on line 182 from an OR gate 184. This OR gate receives the signal from one of the two lines 80 and threshold gates 78 when the speed difference between a front an a rear wheel exceeds a prescribed threshold.

There has thus been shown and described a novel apparatus for automatically controlling a tail light of a motor vehicle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. Apparatus for controlling a tail light of a motor vehicle, said apparatus comprising, in combination:
   (a) a source of voltage;
   (b) switch means for selectively connecting said voltage source with said tail light; and
   (c) control means, coupled to said switch means, for automatically closing said switch means, thereby connecting said tail light with said voltage source, after the speed of said vehicle falls below a prescribed speed threshold for a prescribed period of time.

2. The apparatus defined in claim 1, further comprising a flasher switch connected in series with said switch means, said flasher switch causing said tail light to flash on and off at a substantially constant rate when said switch means is closed.

3. The apparatus defined in claim 1, wherein said control means is operative to close and open said switch means at a prescribed rate, thereby to cause said tail light to flash on and off after the speed of said vehicle falls below a prescribed threshold for a prescribed period of time.

4. The apparatus defined in claim 3, wherein said prescribed rate is variable.

5. The apparatus defined in claim 1, wherein said prescribed speed threshold is in the range of 0–30 MPH.

6. The apparatus defined in claim 1, wherein said prescribed period of time is in the range of 0–60 seconds.

7. The apparatus defined in claim 1, wherein said control means is operative to close said switch means in response to the simultaneous occurrence of a plurality of conditions, one of which is that the speed of the vehicle falls below a prescribed speed threshold for a prescribed period of time.

8. The apparatus defined in claim 1, wherein said control means is operative to close said switch means, after the speed of said vehicle falls below a prescribed threshold speed for a prescribed period of time, only upon the simultaneous occurrence of the further condition that an engine temperature of the motor vehicle exceeds a prescribed temperature threshold.

9. The apparatus defined in claim 1, wherein said control means is operative to close said switch means, after the speed of the vehicle falls below a prescribed speed threshold for a prescribed period of time, only upon the simultaneous occurrence of the further condition that a prescribed length of time has elapsed since the vehicle ignition switch has been turned on.

10. The apparatus defined in claim 1, further comprising means permitting manual adjustment of said prescribed speed threshold.

11. The apparatus defined in claim 1, further comprising means permitting manual adjustment of said prescribed period of time.

12. Apparatus for controlling a tail light of a motor vehicle, said apparatus comprising, in combination:
 (a) a source of voltage;
 (b) switch means for selectively connecting said voltage source with said tail light; and
 (c) control means, coupled to said switch means, for closing said switch means, thereby connecting said tail light with said voltage source, after the instantaneous speed of said vehicle falls below a prescribed threshold value from the time average speed of said vehicle for a prescribed period of time.

13. Apparatus for controlling a tail light of a first motor vehicle, said apparatus comprising, in combination:
 (a) a source of voltage;
 (b) switch means for selectively connecting said voltage source with said tail light;
 (c) means for determining the difference in speed between said first vehicle and a second motor vehicle that is approaching said first vehicle from one of the front and rear thereof and that is proceeding in substantially the same direction as said first vehicle; and
 (d) control means, coupled to said switch means and to said speed difference determining means, for closing said switch means, thereby connecting said tail light with said voltage source, after said speed difference exceeds a prescribed threshold.

14. The apparatus defined in claim 13, further comprising means for determining the distance between said first vehicle and said second vehicle, and wherein said control means varies said prescribed threshold in dependence upon said distance.

15. The apparatus defined in claim 13, further comprising means for determining the speed of said first vehicle, and wherein said control means varies said prescribed threshold in dependence upon said first vehicle speed.

16. Apparatus for controlling a tail light of a first motor vehicle, said apparatus comprising, in combination:
 (a) a source of voltage;
 (b) switch means for selectively connecting said voltage source with said tail light;
 (c) means for determining the distance between said first vehicle and a second motor vehicle that is one of ahead and behind said first vehicle and is proceeding in substantially the same direction as said first vehicle; and
 (d) control means, coupled to said switch means and to said distance determining means, for closing said switch means, thereby connecting said tail light with said voltage source, after said distance falls below a prescribed threshold.

17. The apparatus defined in claim 16, further comprising means for determining the speed of said first vehicle, and wherein said control means varies said prescribed threshold in dependence upon said first vehicle speed.

18. Apparatus for controlling a tail light of a motor vehicle, said vehicle having a plurality of road wheels which rotate at substantially the same speed when said vehicle is in normal operation, said apparatus comprising, in combination:
 (a) a source of voltage;
 (b) switch means for selectively connecting said voltage source with said tail light;
 (c) means for determining when a road wheel of said vehicle is not rotating at substantially the same speed as one or more other road wheels thereof; and
 (d) control means, coupled to said switch means and to said determining means, for closing said switch means, thereby connecting said tail light with said voltage source, when a road wheel of said vehicle is not rotating at substantially the same speed as one or more other road wheels thereof.

19. The apparatus defined in claim 18, wherein said determining means compares the rotational speed of a front road wheel of said vehicle with the rotational speed of a rear road wheel thereof.

20. Apparatus for controlling a tail light of a motor vehicle, said apparatus comprising, in combination:
 (a) a source of voltage;
 (b) switch means for selectively connecting said voltage source with said tail light;
 (c) means automatically responsive to a disable condition of said vehicle for producing a "disabled" signal; and
 (d) control means, coupled to said switch means and to said disabled condition responsive means, for automatically closing said switch means, thereby connecting said trial light with said voltage source, when said vehicle is disabled.

21. The apparatus defined in claim 1, wherein said speed is the instantaneous speed of the vehicle.

22. The apparatus defined in claim 1, wherein said speed is the time average speed of vehicle.

* * * * *